US009195659B2

(12) United States Patent
Masuda

(10) Patent No.: US 9,195,659 B2
(45) Date of Patent: Nov. 24, 2015

(54) REPORT GENERATION APPARATUS, REPORT GENERATION SYSTEM, AND COMPUTER PROGRAM PRODUCT

(71) Applicant: Yusaku Masuda, Kanagawa (JP)

(72) Inventor: Yusaku Masuda, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 244 days.

(21) Appl. No.: 13/680,860

(22) Filed: Nov. 19, 2012

(65) Prior Publication Data

US 2013/0132337 A1 May 23, 2013

(30) Foreign Application Priority Data

Nov. 21, 2011 (JP) .................................. 2011-253978
Oct. 19, 2012 (JP) .................................. 2012-232164

(51) Int. Cl.
| | | |
|---|---|---|
| G06F 17/00 | (2006.01) | |
| G06F 7/00 | (2006.01) | |
| G06F 17/30 | (2006.01) | |
| G06Q 10/10 | (2012.01) | |

(52) U.S. Cl.
CPC .......... G06F 17/30002 (2013.01); G06Q 10/10 (2013.01)

(58) Field of Classification Search
CPC ............... G06F 2221/0737; G06F 2221/2101; G06F 2221/2115; G06F 21/31; G06F 21/33; G06F 2221/2137; G06F 21/00; G06F 21/78; G06F 2221/2141
See application file for complete search history.

(56) References Cited

U.S. PATENT DOCUMENTS

| | | | | |
|---|---|---|---|---|
| 6,700,964 | B2 * | 3/2004 | Schmid et al. ................ | 379/189 |
| 7,181,417 | B1 * | 2/2007 | Langseth et al. ............. | 705/26.5 |
| 7,343,364 | B2 * | 3/2008 | Bram et al. .................... | 706/47 |
| 7,818,282 | B2 * | 10/2010 | Blackwell et al. ............. | 704/8 |
| 8,055,747 | B2 * | 11/2011 | Mazur et al. ................. | 709/223 |
| 2002/0087350 | A1 | 7/2002 | Miida et al. | |
| 2003/0154177 | A1 * | 8/2003 | Holland et al. ............... | 706/60 |
| 2005/0209892 | A1 * | 9/2005 | Miller ........................... | 705/4 |
| 2005/0251412 | A1 | 11/2005 | Miida et al. | |
| 2006/0004738 | A1 * | 1/2006 | Blackwell et al. ............ | 707/4 |
| 2008/0270276 | A1 * | 10/2008 | Herzig .......................... | 705/35 |
| 2009/0006083 | A1 * | 1/2009 | Bachand ...................... | 704/201 |
| 2011/0138202 | A1 * | 6/2011 | Inoue et al. .................. | 713/310 |

FOREIGN PATENT DOCUMENTS

| | | |
|---|---|---|
| JP | 2001-320370 | 11/2001 |
| JP | 2002-132993 | 5/2002 |
| JP | 2002-269293 | 9/2002 |
| JP | 2003-123000 | 4/2003 |

(Continued)

*Primary Examiner* — Angelica Ruiz
(74) *Attorney, Agent, or Firm* — Oblon, McClelland, Maier & Neustadt, L.L.P.

(57) ABSTRACT

A report generation apparatus includes a user information storage unit that stores therein user identification information for identifying a user and regional information on a region where the user is located, so as to associated with each other; a regional information obtaining part that receives user identification information and obtains regional information associated with the received user identification information from the user information storage part; and a generator that obtains device management information relating to usage of a device and generates a report using the obtained device management information and the obtained regional information.

3 Claims, 11 Drawing Sheets

(56) References Cited

FOREIGN PATENT DOCUMENTS

| JP | 2007-018246 | 1/2007 |
| JP | 2007-316265 | 12/2007 |
| JP | 2008-147874 | 6/2008 |

\* cited by examiner

FIG.4

| userId | userName | locale_id | currency_id | time_format_id | ~141 |
|--------|----------|-----------|-------------|----------------|------|
| 0001   | AAA      | 001       | 001         | 005            |      |
| 0002   | BBB      | 002       | 002         | 109            |      |
| :      | :        | :         | :           | :              |      |

| locale_id | locale_name | langType | ~142 |
|-----------|-------------|----------|------|
| 001       | USA         | 001      |      |
| 002       | JAPAN       | 002      |      |
| :         | :           | :        |      |

| currency_id | currency_name | rate   | ~143 |
|-------------|---------------|--------|------|
| 001         | DOLLAR        | 0.0125 |      |
| 002         | YEN           | 1      |      |
| :           | :             | :      |      |

FIG.6

| time_format_id | locale_name | LangType | currency_name | rate |
|---|---|---|---|---|
| 005 | USA | 001 | DOLLAR | 0.0125 |

FIG.7

| time_format_id | locale_name | LangType | currency_name | rate |
|---|---|---|---|---|
| 109 | JAPAN | 002 | YEN | 1 |

FIG.8

| DEVICE PROPERTY | TCO VALUE | DATA VALUE |
|---|---|---|
| MANUFACTURE, MODEL, SERIAL NUMBER | $ | Jan 2011, Feb 2011, Mar 2011, Apr 2011 |

FIG.9

| DEVICE PROPERTY | | | TCO VALUE ($) | | | |
|---|---|---|---|---|---|---|
| MANUFACTURE | MODEL | SERIAL NUMBER | Jan 2011 | Feb 2011 | Mar 2011 | Apr 2011 |
| VENDER A | xx | yy-yy-yy | 2.56 | 6.55 | 6.76 | 5.93 |
| VENDER A | xx | yy-yy-yy | 1.11 | 2.56 | 45.45 | 46.53 |
| VENDER A | xx | yy-yy-yy | 2.52 | 2.52 | 4.53 | 4.56 |
| VENDER A | xx | yy-yy-yy | 4.53 | 54.45 | 2.56 | 2.56 |
| VENDER A | xx | yy-yy-yy | 1.11 | 0.52 | 0.42 | 2.56 |

| DEVICE PROPERTY | TCO VALUE | PERIOD |
|---|---|---|
| MANUFACTURE, MODEL, SERIAL NUMBER | YEN | JANUARY TO APRIL 2011 |

FIG.11

| DEVICE PROPERTY | | | TCO VALUE (YEN) | | | |
|---|---|---|---|---|---|---|
| MANUFACTURE | MODEL | SERIAL NUMBER | Jan 2011 | Feb 2011 | Mar 2011 | Apr 2011 |
| VENDER A | xx | yy-yy-yy | 205 | 524 | 541 | 475 |
| VENDER A | xx | yy-yy-yy | 89 | 205 | 3636 | 3723 |
| VENDER A | xx | yy-yy-yy | 202 | 202 | 363 | 365 |
| VENDER A | xx | yy-yy-yy | 363 | 4356 | 205 | 205 |
| VENDER A | xx | yy-yy-yy | 89 | 42 | 34 | 205 |

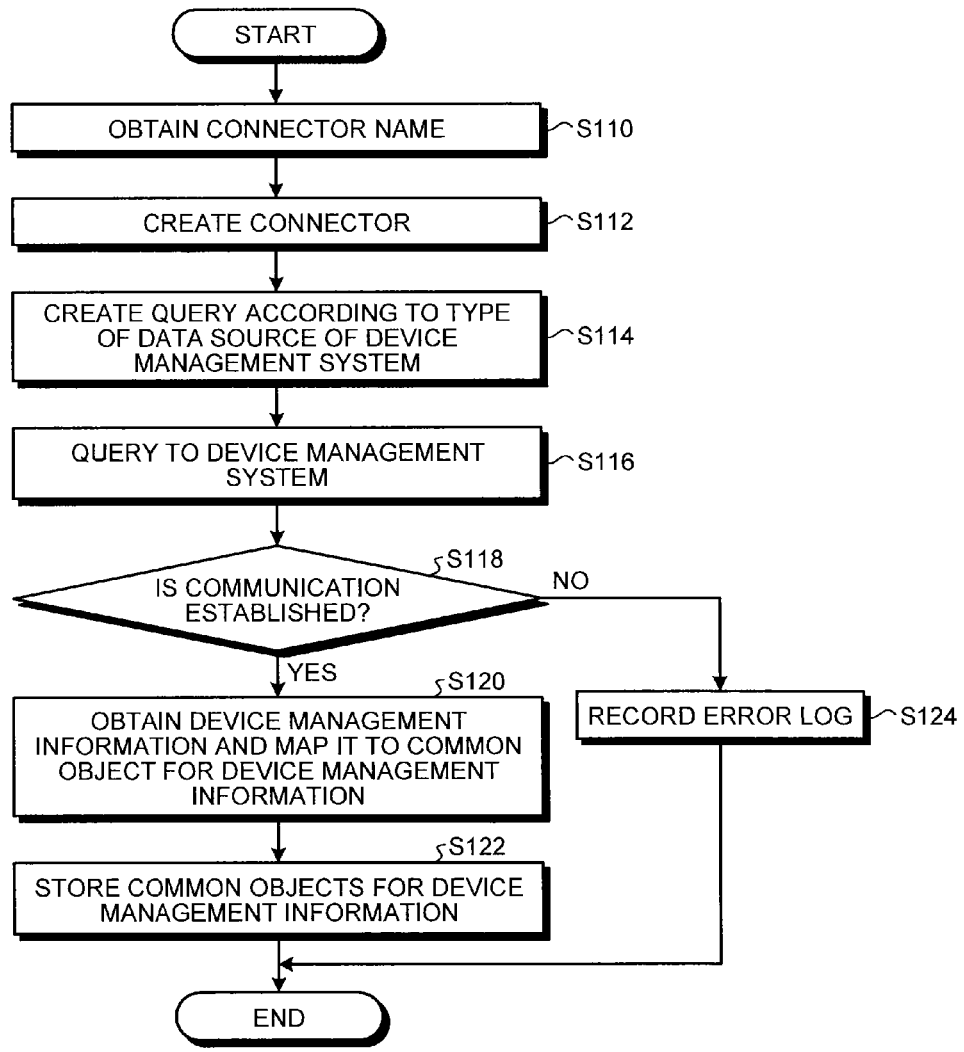

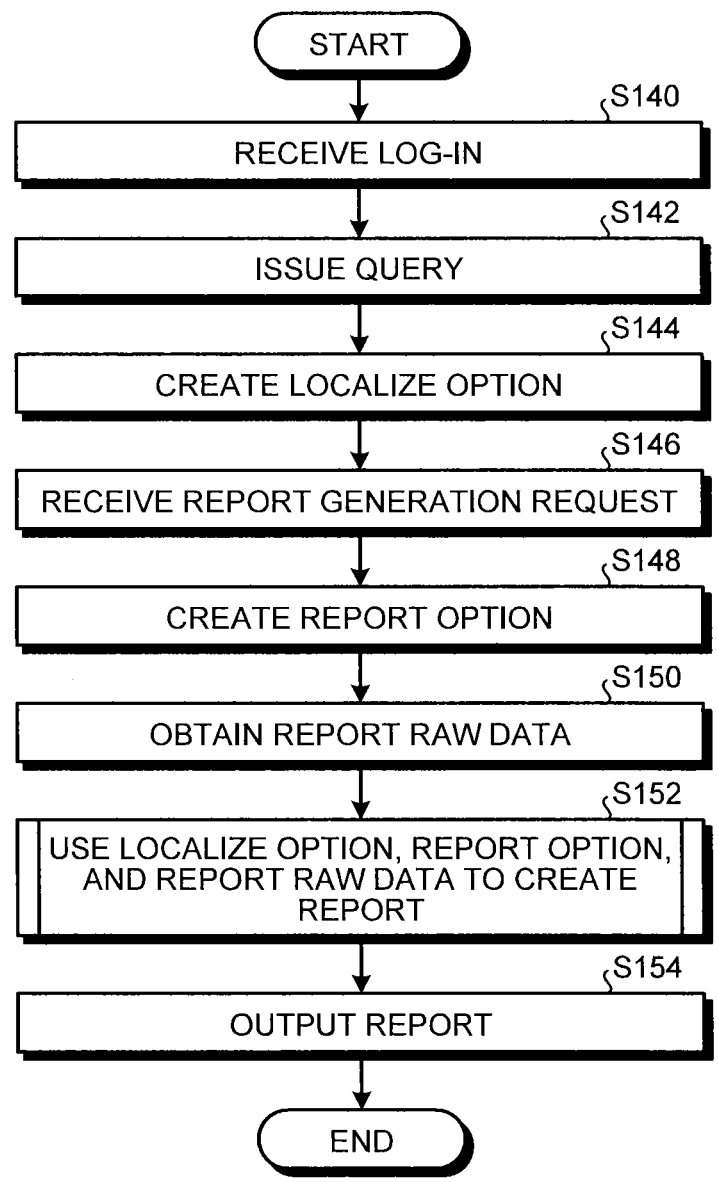

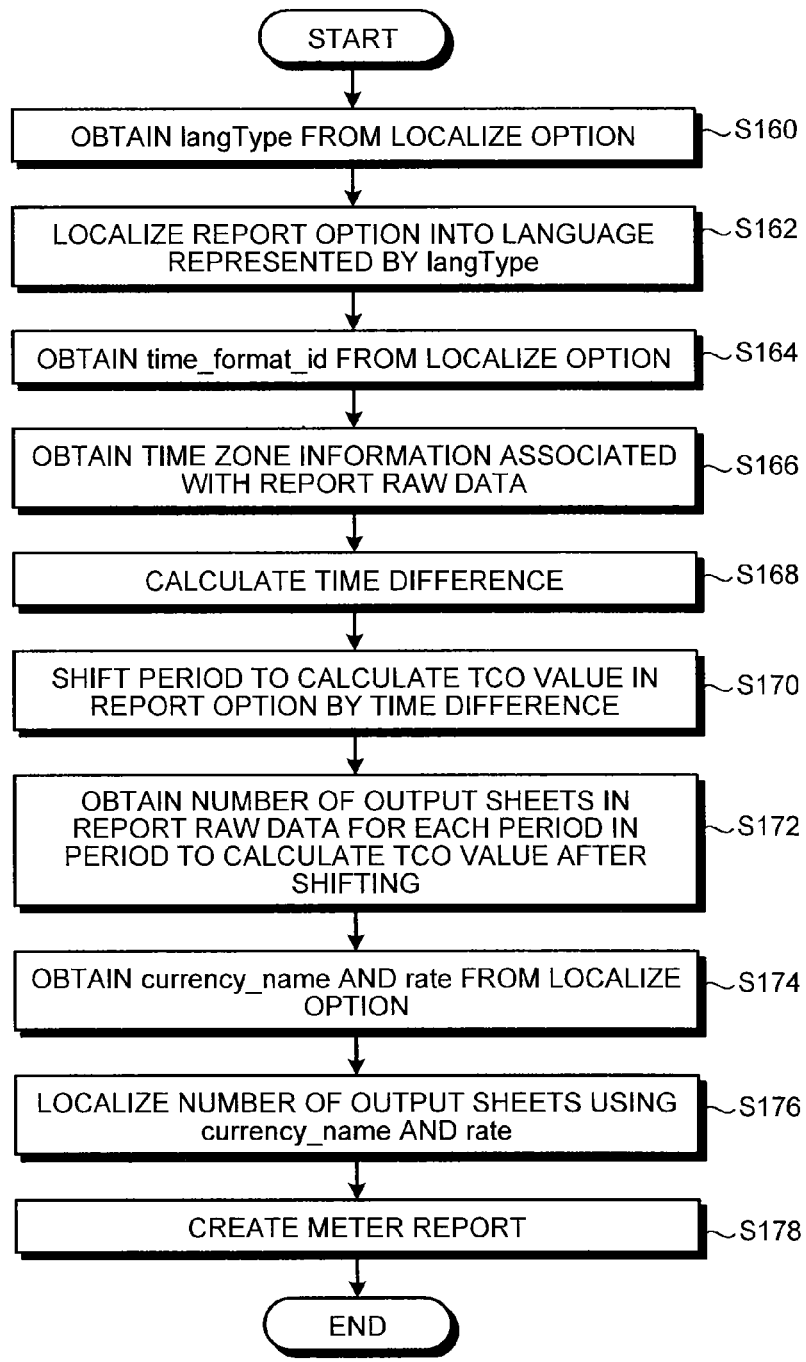

REPORT GENERATION APPARATUS, REPORT GENERATION SYSTEM, AND COMPUTER PROGRAM PRODUCT

CROSS-REFERENCE TO RELATED APPLICATIONS

The present application claims priority to and incorporates by reference the entire contents of Japanese Patent Application No. 2011-253978 filed in Japan on Nov. 21, 2011 and Japanese Patent Application No. 2012-232164 filed in Japan on Oct. 19, 2012.

BACKGROUND OF THE INVENTION

1. Field of the Invention

The present invention relates to a report generation apparatus, a report generation system, and a computer program product.

2. Description of the Related Art

In the filed of managed printing service (MPS), a service level agreement (SLA) including, as an assurance item, for example, the maximum number of times of failure in a given period has been generally signed as quality assurance for device maintenance service for customers.

To achieve the assurance item, device management systems for managing device management information such as usage of devices or service desk systems for managing service information such as device failure have been introduced.

For example, a technique for generating and presenting service reports on network devices is disclosed in Japanese Patent Application Laid-open No. 2001-320370.

However, in the related art as described above, for example, if the customer who has introduced an MPS is a global enterprise that has developed business globally, users in various regions may look at the report.

Therefore, there is a need for a report generation apparatus, a report generation system, and a computer program product capable of generating a report taking account of the characteristics of the region where the user is located.

SUMMARY OF THE INVENTION

According to an embodiment, there is provided a report generation apparatus that includes a user information storage part that stores therein user identification information for identifying a user and regional information on a region where the user is located, so as to associated with each other; a regional information obtaining part that receives user identification information and obtains regional information associated with the received user identification information from the user information storage part; and a generator that obtains device management information relating to usage of a device and generates a report using the obtained device management information and the obtained regional information.

According to another embodiment, there is provided a report generation system that includes a user information storage part that stores therein user identification information for identifying a user and regional information on a region where the user is located, so as to be associated with each other; a regional information obtaining part that receives user identification information and obtains regional information associated with the received user identification information from the user information storage part; and a generator that obtains device management information relating to usage of a device and generates a report using the obtained device management information and the obtained regional information.

According to still another embodiment, there is provided a computer program product that includes a non-transitory computer-readable medium including programmed instructions. The instructions cause a computer to execute receiving user identification information for identifying a user; obtaining regional information associated with the received user identification information from a user information storage part that stores therein the user identification information to be associated with regional information on a region where the user is located; obtaining device management information relating to usage of a device; and generating a report using the obtained device management information and the obtained regional information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of information stored in a user information storage unit of the embodiment;

FIG. 6 is a diagram illustrating an example of a localize option of the embodiment;

FIG. 7 is a diagram illustrating another example of the localize option of the embodiment;

FIG. 8 is a diagram illustrating an example of a report option of the embodiment;

FIG. 9 is a diagram illustrating an example of a meter report of the embodiment;

FIG. 10 is a diagram illustrating another example of the report option of the embodiment;

FIG. 11 is a diagram illustrating another example of a meter report of the embodiment;

FIG. 12 is a flowchart illustrating an example of device management information collection processing performed in the report generation system of the embodiment;

FIG. 13 is a flowchart illustrating an example of meter report generation processing performed in the report generation system of the embodiment;

FIG. 14 is a flowchart illustrating a detailed example of meter report generation processing performed in the report generation system of the embodiment.

DETAILED DESCRIPTION OF THE PREFERRED EMBODIMENTS

Embodiments of the present invention will now be described in detail with reference to accompanying drawings.

Firstly, the configuration of a report generation system including the report generation apparatus of an embodiment will be described.

Figure 1:
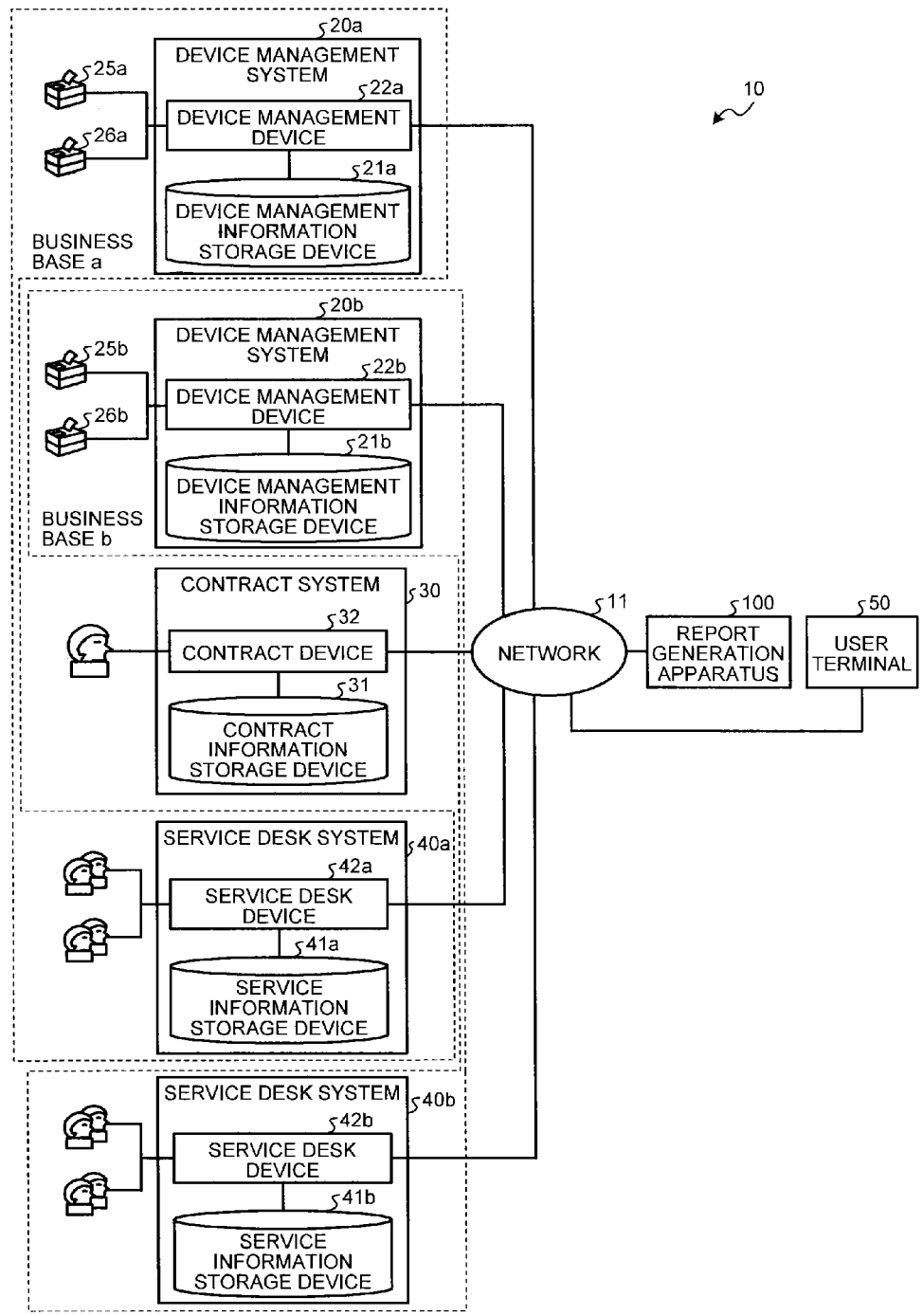
FIG. 1 is a block diagram illustrating an example of the configuration of a report generation system according to an embodiment of the present invention.

FIG. 1 is a block diagram illustrating an example of the configuration of a report generation system 10 of the present embodiment. As illustrated in FIG. 1, the report generation system 10 includes device management systems 20a and 20b, a contract system 30, service desk systems 40a and 40b, a user terminal 50, and a report generation apparatus 100.

The device management system 20a and the service desk system 40a are installed in a business base a, and the device management system 20b and the service desk system 40b are installed in a business base b. The business bases a and b belong to the same customer. In the present embodiment, the business bases a and b exist in the same region; however, the embodiment is not limited thereto, and the business bases a and b may exist in different regions. It should be noted that a "region" is a concept that includes a country. In FIG. 1, a case in which there are two device management systems and two service desk systems is exemplified, but the present invention is not limited thereto. Any number of the device management systems and any number of the service desk systems may be used as long as it is a plural number.

The device management systems 20a and 20b, the contract system 30, the service desk systems 40a and 40b, the user terminal 50, and the report generation apparatus 100 are connected to each other through a network 11. The network 11 can be achieved, using a public communication line or a specific communication line (dedicated line), for example.

The device management system 20a is a database system for managing device management information about usage of an image forming device, such as a printing device, a copying machine, an MFP, or a facsimile device, installed in the business base a. The MFP is a device having at least two functions of copying, printing, scanning, and facsimile transmission.

In the example illustrated in FIG. 1, only printing devices 25a and 26a are exemplified as image forming devices installed in the business base a, but image forming devices to be managed by the device management system 20a are not limited thereto. Additionally, in the present embodiment, an example in which the device management systems 20a and 20b manage the image forming devices will be described, but the managed device is not limited thereto and any information processing device such as a personal computer (PC), or any electronic device such as a projector, a camera, a refrigerator, a fluorescent light, a vending machine, and a hand-held terminal, which can obtain device management information, may be used.

In the present embodiment, an example in which device information for identifying the image forming device and the number of output (printing) sheets of the image forming device are used as the device management information will be described, but the present invention is not limited thereto. Furthermore, the device information in the device management information is a combination of a manufacturer name, a model name, and a serial number, but the present invention is not limited thereto.

The device management system 20a includes a device management information storage device 21a and a device management device 22a.

The device management information storage device 21a is a database in which device management information obtained by the device management device 22a, which will be described later, is accumulated. In the present embodiment, the device management information storage device 21a stores therein device information and the number of output sheets of image forming devices to be managed by the device management system 20a so as to be associated with each other.

The device management device 22a is a typical computer such as a server device, and periodically (e.g. every hour) obtains the device management information from the image forming devices to be managed by the device management system 20a and registers the device management information in the device management information storage device 21a. In the present embodiment, the device management device 22a periodically obtains device information and the number of output sheets from the image forming devices to be managed by the device management system 20a and registers the number of output sheets in the device management information storage device 21a to be associated with device information of the device management information storage device 21a coincident with the obtained device information each time the device management device 22a obtains the device information and the number of output sheets.

The device management system 20b is a database system for managing device management information of image forming devices installed in the business base b. In addition, the device management system 20b is a database system of a different type from the device management system 20a, in which at least the type of a data source differs from that of the device management system 20a. The type of the data source may include, for example, MySQL, Oracle, or MSSQL. In the example illustrated in FIG. 1, two printing devices 25b and 26b are exemplified as image forming devices installed in the business base b, but image forming devices to be managed by the device management system 20b are not limited thereto.

The device management system 20b includes a device management information storage device 21b, and a device management device 22b.

The device management information storage device 21b is a database in which device management information obtained by the device management device 22b, which will be described later, is accumulated. In the present embodiment, the device management information storage device 21b stores therein device information and the number of output sheets of the image forming devices to be managed by the device management system 20b so as to be associated with each other.

The device management device 22b is a typical computer such as a server device, and periodically obtains the device management information from the image forming devices to be managed by the device management system 20b and registers the device management information in the device management information storage device 21b. In the present embodiment, the device management device 22b periodically (e.g. every hour) obtains device information and the number of output sheets from the image forming devices to be managed by the device management system 20b and registers the number of output sheets in the device management information storage device 21b to be associated with device information of the device management information storage device 21b coincident with the obtained device information each time the device management device 22b obtains the device information and the number of output sheets.

As described above, in the present embodiment, the device management systems 20a and 20b obtain the device management information every hour, for example, and maintain the device management information. Therefore, the device management information of the present embodiment represents usage of the image forming apparatus to be managed for every day and hour.

The contract system 30 is a database system for managing contract information about quality assurance for each device.

In the present embodiment, a service level agreement (SLA) containing, as an assurance item, the maximum number of times of failure in a given period by failure type of respective devices installed in the business bases a and b has been signed between a company managing the report generation system 10 and customers at the business bases a and b.

In the present embodiment, therefore, a case in which the contract information is the maximum number of times of failure in a given period by failure type of respective devices installed in the business bases a and b will be described by way of example, but the present invention is not limited thereto. For example, when the maximum time for service personnel to arrive the business base, the minimum rate of operation in the given period, the maximum time to repair, and the like are listed as assurance items of the SLA, they may be treated as contract information. The contract system 30 manages contract information with other customers, in addition to the contract information with the customers at the business bases a and b.

The contract system 30 includes a contract information storage device 31 and a contract device 32. The contract information storage device 31 is a database in which contract information that has been input to the contract device 32, which will be described later, is stored, and stores therein contract information so as to be associated with each customer ID for identifying a customer. The contract device 32 is a typical computer such as a server device, and receives customer IDs and contract information that has been input by, for example, a sales personnel of the company that manages the report generation system 10 to the contract device 32 using an input device that is not illustrated. The contract device 32 registers the input contract information in the contract information storage device 31 so as to be associated with a customer ID of the contract information storage device 31 coincident with the input customer ID.

The service desk system 40a is a database system for managing service information about device failure of the image forming devices installed in the business base a. The image forming devices to be managed by the service desk system 40a are not limited to the printing devices 25a and 26a, similar to the device management system 20a.

In the present embodiment, a case in which device information for identifying the image forming device and the number of times of failure by failure type of the image forming device are used as the service information will be described by way of example, but the present invention is not limited thereto. The service information is information about device failure and may be information corresponding to the contract information, such as the maximum time for service personnel to arrive the business base, a rate of operation, and the maximum time to restore. In the present embodiment, device information of the service information is a serial number, but the present invention is not limited thereto.

The service desk system 40a includes a service information storage device 41a and a service desk device 42a.

The service information storage device 41a is a database in which service information according to device failure content that has been input by the service desk device 42a, which will be described later, is accumulated. In the present embodiment, the service information storage device 41a stores therein the device information and the number of times of failure by failure type of the image forming device to be managed by the service desk system 40a. Additionally, the service information storage device 41a stores therein the device failure content to be associated with the device information. The device failure content includes, for example, a device failure type, occurrence date and time of the device failure, and a solution to the device failure.

The service desk device 42a is a typical computer such as a server device. The service desk device 42a registers, in the service information storage device 41a, service information according to the device failure content of the image forming device to be managed by the service desk system 40a that has been input by a person in charge of the service desk system 40a, a service engineer, or the like to the service desk device 42a using an input device that is not illustrated.

In the present embodiment, the service desk device 42a receives the device information and the device failure content of the image forming device to be managed by the service desk system 40a. The service desk device 42a updates the number of times of failure by failure type related to the device failure content that has been input, which is associated with device information of the service information storage device 41a coincident with the input device information, and registers the input device failure content in the service information storage device 41a to be associated with the device information.

The service desk system 40b is a database system for managing service information of the image forming devices installed in the business base b. In addition, the service desk system 40b is a database system of a different type from the service desk system 40a, in which at least a type of a data source differs from that of the service desk system 40a. It should be noted that the image forming devices to be managed by the service desk system 40b are not limited to the printing devices 25b and 26b, similar to the device management system 20b.

The service desk system 40b includes a service information storage device 41b and a service desk device 42b.

The service information storage device 41b is a database in which service information according to the device failure content that has been input by the service desk device 42b, which will be described later, is stored. In the present embodiment, the service information storage device 41b stores therein the device failure content in addition to the device information and the number of times of failure by device failure type of the image forming devices to be managed by the service desk system 40b to be associated with each other.

The service desk device 42b is a typical computer such as a server device. The service desk device 42b registers, in the service information storage device 41b, service information according to the device failure content of the image forming device to be managed by the service desk system 40b that has been input by a person in charge of the service desk system 40b, a service engineer, or the like to the service desk device 42b using an input device that is not illustrated.

In the present embodiment, the service desk device 42b receives the device information and the device failure content of the image forming device to be managed by the service desk system 40b. The service desk device 42b updates the device failure for each device failure type related to the device failure content that has been input, which is associated with device information of the service information storage device 41b coincident with the device information that has been input, and registers the device failure content that has been input in the service information storage device 41b to be associated with the device information.

As described above, in the service desk systems 40a and 40b, the service information is registered manually. Accordingly, the device information consists of only a serial number from the viewpoint of simplification of registration (input). On the other hand, in the device management systems 20a and 20b, the registration of device management information is automated. Accordingly, the registration simplification is less required, and the device information consists of a combination of a manufacturer name, a model name, and a serial number.

The user terminal 50 is a terminal device of the customer, and requests the report generation apparatus 100 to generate a report on a browser displayed on a display device that is not illustrated. The user terminal 50 obtains the report generated by the report generation apparatus 100 and displays the obtained report on the browser.

Figure 2:
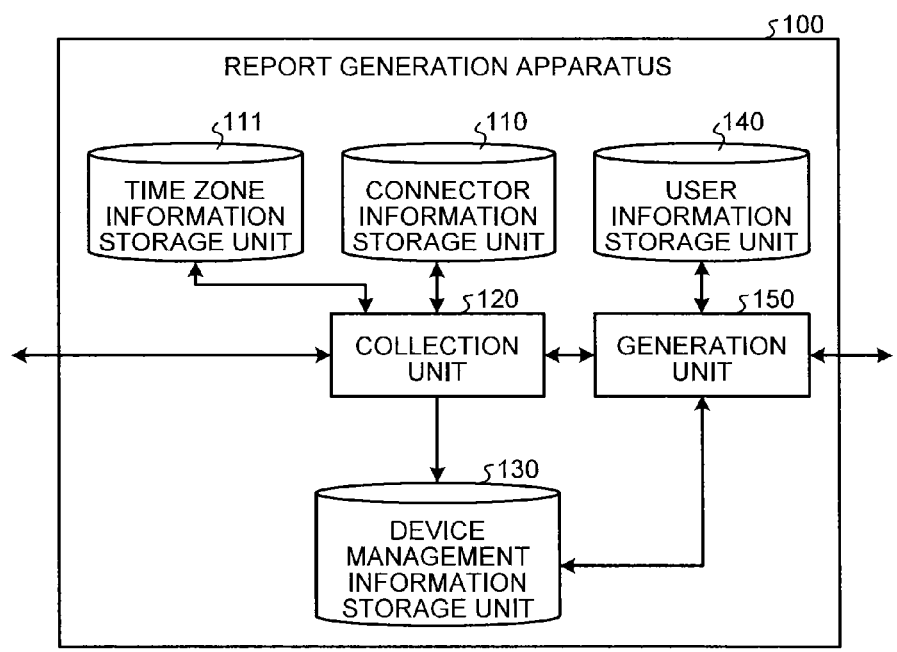
FIG. 2 is a block diagram illustrating an example of the configuration of a report generation apparatus of the embodiment.

The report generation apparatus 100 is a server device for generating a report of the image forming device installed in the business base a or the business base b according to a request from the user terminal 50. FIG. 2 is a block diagram illustrating an example of the configuration of the report generation apparatus 100 of the present embodiment. As illustrated in FIG. 2, the report generation apparatus 100 includes a connector information storage unit 110, a time zone information storage unit 111, a collection unit 120, a device management information storage unit 130, and a user information storage unit 140, and a generation unit 150.

The connector information storage unit 110, the time zone information storage unit 111, the device management information storage unit 130, and the user information storage unit 140 can be achieved using at least one of storage devices capable of magnetic, optical, or electrical storage, such as a hard disk drive (HDD), a solid state drive (SSD), a memory card, an optical disc, read only memory (ROM), and random access memory (RAM). The collection unit 120 and the generation unit 150 can be achieved using, for example, a control device such as a central processing unit (CPU).

The connector information storage unit 110 stores therein information of a connector created by the collection unit 120, which will be described later. For example, the connector information storage unit 110 stores therein a table in which a business base ID for identifying a business base of a customer is associated with a connector name of the connector that corresponds to a data source of a database system (the device management system and the service desk system) that has been introduced in the business base of the customer. The connector will be described in detail later.

The time zone information storage unit 111 stores therein information of a time zone. For example, the time zone information storage unit 111 stores therein a table in which a customer's business base ID and time zone information representing the time zone of the region where the customer's business base exists indicated by the business base ID. In the present embodiment, the time zone is represented with a difference from Universal Time Coordinated (UTC).

The collection unit 120 collects the device management information from the device management systems 20a and 20b, the contract information from the contract system 30, and the service information from the service desk systems 40a and 40b.

When the collection unit 120 collects the device management information from the device management systems 20a and 20b, the collection unit 120 issues an obtaining request to the respective device management systems 20a and 20b depending on types of the device management systems, and collects pieces of device management information from the respective device management systems 20a and 20b. The collection unit 120 converts the collected pieces of device management information into a common format for device management information, and stores the pieces of device management information in the device management information storage unit 130.

Specifically, the collection unit 120 transmits queries to the respective device management systems 20a and 20b depending on types of databases, and collects pieces of device management information from the device management systems 20a and 20b. The collection unit 120 maps the collected pieces of device management information to a common object for device management information, thereby converting the pieces of device management information into the common format for device management information, and storing the pieces of device management information in the device management information storage unit 130.

Figure 3:
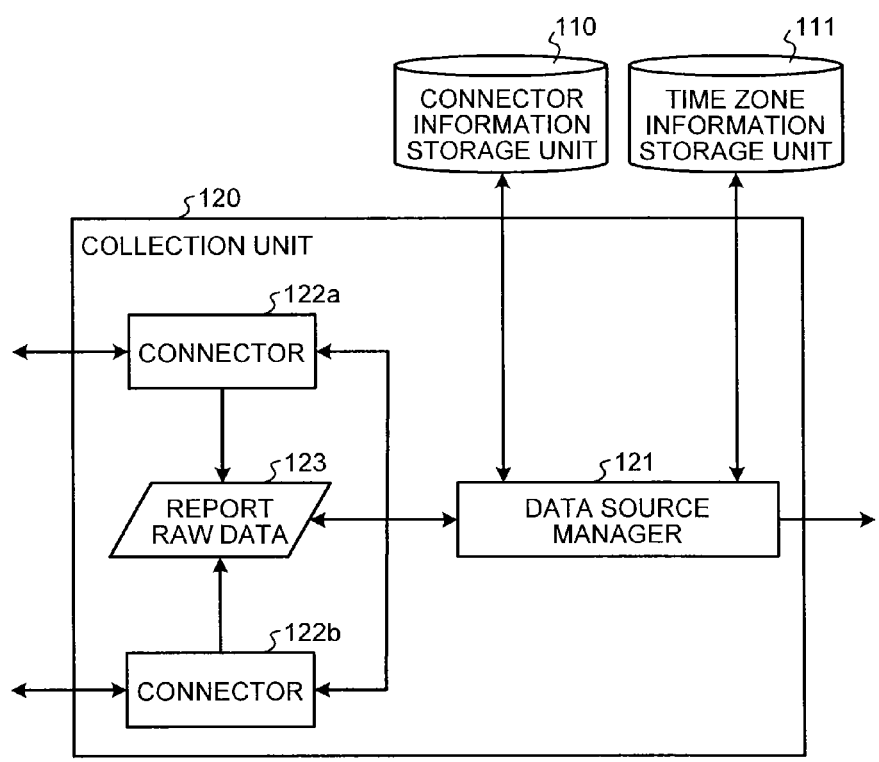
FIG. 3 is a block diagram illustrating an example of a detailed configuration of a collection unit of the embodiment when it collects pieces of device management information.

FIG. 3 is a block diagram illustrating an example of a detailed configuration of the collection unit 120 of the present embodiment when it collects the pieces of device management information. As illustrated in FIG. 3, the collection unit 120 includes a data source manager 121 and connectors 122a and 122b.

The data source manager 121 obtains a connector name associated with a business base ID indicating a business base of a collection target from the connector information storage unit 110 at timing of device management information collection, and creates a connector corresponding to the obtained connector name through reflection.

In the present embodiment, the data source manager 121 creates the connector 122a from a connector name associated with the business base ID of the business base a and creates the connector 122b from the connector name associated with the business base ID of the business base b. The connector 122a corresponds to a data source of the device management system 20a in the business base a and the connector 122b corresponds to a data source of the device management system 20b in the business base b.

The data source manager 121 stores report raw data 123 created by the connectors 122a and 122b in the device management information storage unit 130. In the present embodiment, the data source manager 121 obtains the time zone information associated with the business base ID indicating the business base that is a collection source of the device management information from the time zone information storage unit 111 each time when the connectors 122a, 122b create the report raw data 123. For example, when the connector 122a creates the report raw data 123, the data source manager 121 obtains the time zone information associated with the business base ID indicating the business base a from the time zone information storage unit 111. When the connector 122b creates the report raw data 123, the data source manager 121 obtains the time zone information associated with the business base ID indicating the business base b from the time zone information storage unit 111. The business bases a and b are located in China and the time zone information obtained by the data source manager 121 represents the time zone of China (UTC+8), but the present invention is not limited thereto. Then, the data source manager 121 associates the created report raw data 123 with the obtained time zone information to be registered in the device management information storage unit 130.

The connectors 122a and 122b create a query, according to types of data sources or table definitions of the respective systems, that requests the data sources of the device management systems 20a and 20b to obtain pieces of device management information and transmit the query. Each of the connectors 122a and 122b obtains device information (a combination of a manufacturer name, a model name, and a serial number) and the number of output sheets as the device management information.

The report raw data 123 will now be described. The report raw data 123 is a common object created by the connectors 122*a* and 122*b*, and includes, in its own fields, information such as a manufacturer name (Manufacture), a model name (Model), a serial number (Serial Number), and the number of output sheets (Counter). The number of output sheets (Counter), at least, out of some pieces of data in the report raw data 123 is represented as numerical data.

Each of the connectors 122*a* and 122*b* creates an instance of the report raw data 123 from the obtained device information and the number of output sheets, and maps the created instance to a list of the report raw data 123 according to the fields, whereby the report raw data 123 is created.

With reference to FIG. 2, when the collection unit 120 collects the contract information from the contract system 30, the collection unit 120 issues an obtaining request to the contract system 30 and collects the contract information. For example, the collection unit 120 transmits a query to the contract system 30 depending on a type of a database, and collects the contract information from the contract system 30.

When the collection unit 120 collects the pieces of service information from the service desk systems 40*a* and 40*b*, the collection unit 120 issues an obtaining request to the respective service desk systems 40*a* and 40*b* depending on types of the service desk systems and collects the pieces of service information from the respective service desk systems 40*a* and 40*b*. The collection unit 120 converts the collected pieces of service information into a common format for service information.

Specifically, the collection unit 120 transmits queries to the respective service desk systems 40*a* and 40*b* depending on types of databases of the systems, and collects pieces of service information from the service desk systems 40*a* and 40*b*. The collection unit 120 maps the collected pieces of service information to a common object for service information, thereby converting the pieces of service information into a common format for service information.

For example, once the data source manager 121 of the collection unit 120 is instructed to collect the contract information and the service information by a generation unit 150, which will be described later, the data source manager 121 creates connectors corresponding to the contract system 30 and the service desk systems 40*a* and 40*b* at timing of contract information and service information collection, in the same manner as the collection of the device management information.

Each of connectors creates a query, according to types of data sources or table definitions of the respective systems, that requests the data source of the corresponding system to obtain the contract information or the service information and transmits the query to obtain the contract information or the service information. The contract information is, for example, the maximum number of times of failure in devices installed in the business bases a or b in a given period by device failure type. The service information is, for example, the device information (a serial number) and the number of times of failure by device failure type.

Each of the connectors corresponding to the service desk systems 40*a* and 40*b* creates an instance of the common object for the service information from the obtained service information, and maps the created instance to a list of the common object for the service information according to the field, whereby the common object for the service information is created.

After that, each of the connectors transfers the contract information or the common object for the service information to the data source manager 121, which in turn, transfers the contract information and the common object for the service information that has been transferred by each of the connectors to the generation unit 150, which will be described later.

With reference to FIG. 2, in the device management information storage unit 130, the device management information collected and converted into the common format for device management information by the collection unit 120 is stored. Specifically, the device management information storage unit 130 stores therein the report raw data 123 created by the collection unit 120. In the present embodiment, the device management information storage unit 130 stores therein the time zone information representing the time zone of the region where the business base a or b exists to be associated with the report raw data 123 created by the collection unit 120.

The user information storage unit 140 stores therein user identification information for identifying the user to be associated with regional information on the region where the user is located. In the present embodiment, the regional information is the language used in the region, the time zone of the region, and the currency used in the region, but the present invention is not limited thereto.

FIG. 4 is a diagram illustrating an example of information stored in the user information storage unit 140 of the embodiment. In the example illustrated in FIG. 4, the user information storage unit 140 stores therein a user table 141, a locale table 142, and a currency table 143.

The user table 141 is a table in which userId indicating a user ID of the user, userName indicating a name of the user, locale_id indicating an ID for locale information of the region where the user is located, currency_id indicating an ID for currency information of the region where the user is located, and time_format_id indicating an ID for the time zone of the region where the user is located are associated with each other.

In the example illustrated in FIG. 4, the ID "005" indicates the time zone (UTC-5) of the region (e.g. the eastern United States) that is five hours behind UTC, while the time zone ID "109" indicates the time zone (UTC+9) of the region (e.g. Japan) that is nine hours ahead of UTC.

The locale table 142 is a table in which locale_id indicating an ID for the locale information, locale_name indicating a name of the region (country), and langType indicating a language used in the region are associated with each other. In the example illustrated in FIG. 4, "001" in langType indicates English, while "002" indicates the Japanese language.

The currency table 143 is a table in which currency_id indicating an ID for the currency information, currency_name indicating a currency, and "rate" indicating exchange rate of the currency are associated with each other. In the example illustrated in FIG. 4, the exchange rate of the currency ("rate") is represented in a ratio of the currency to Japanese yen (YEN), and it is assumed that the exchange rate between the Japanese yen (YEN) and the U.S. dollar (DOLLAR) is 80 yen per dollar.

In the example illustrated in FIG. 4, the user table 141 and the locale table 142 are associated with each other by locale_id, while the user table 141 and the currency table 143 are associated with each other by currency_id.

With reference to FIG. 2 again, the generation unit 150 receives the user identification information from the user terminal 50 and obtains the regional information associated with the received user identification information from the user information storage unit 140. The generation unit 150 also obtains the device management information from the device management information storage unit 130 and generates a report using the obtained device management information and the obtained regional information. Then, the generation unit 150 outputs the generated report to the user terminal 50.

Figure 5:
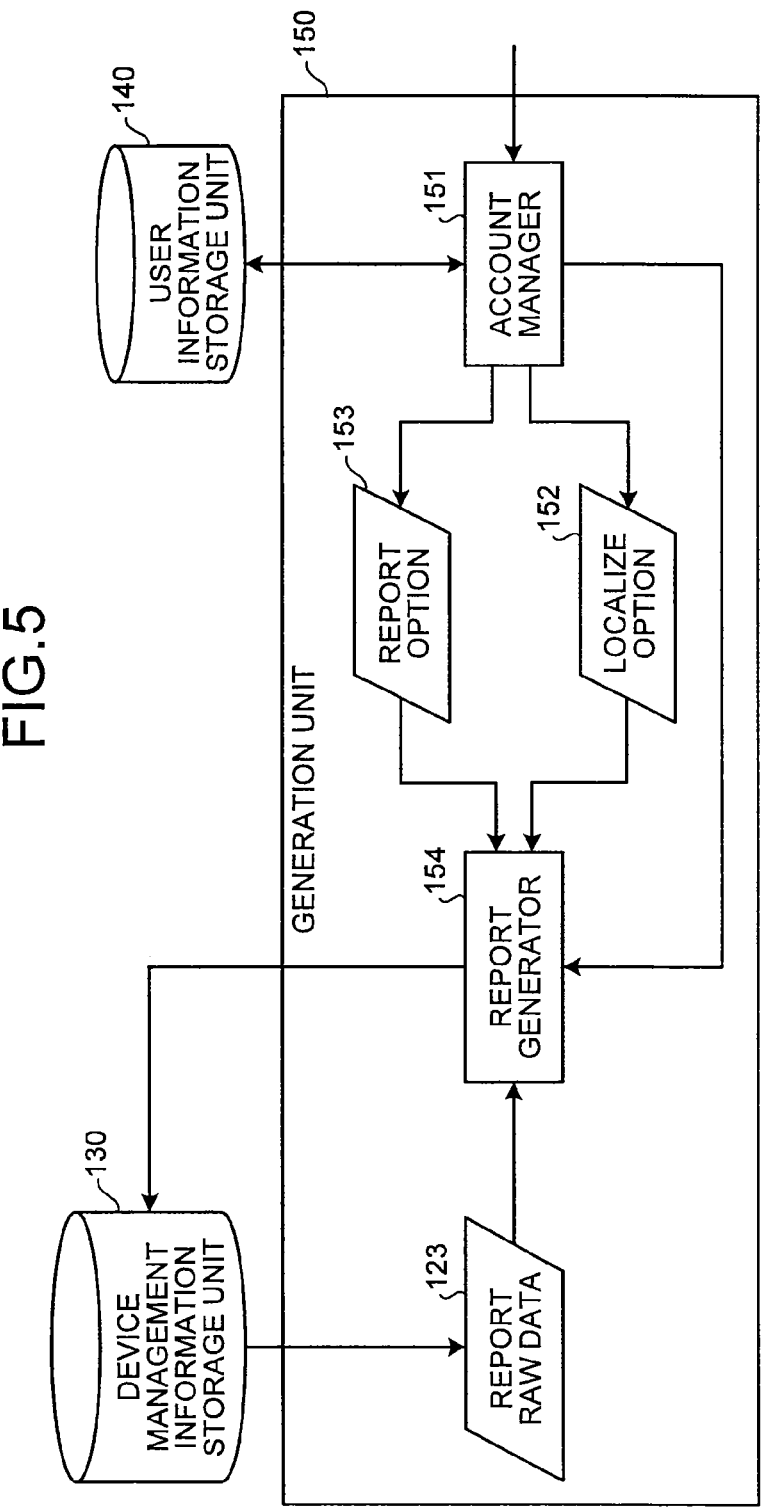
FIG. 5 is a block diagram illustrating an example of a detailed configuration of a generation unit of the report generation apparatus of the embodiment.

FIG. 5 is a block diagram illustrating an example of a detailed configuration of the generation unit 150 of the present embodiment. As illustrated in FIG. 5, the generation unit 150 includes an account manager 151 (an example of a regional information obtaining unit, a generation request receiving unit, and a period receiving unit) and a report generator 154 (an example of a creation unit).

The account manager 151 receives log-in from the user through the user terminal 50 to obtain a user ID and password of the user to authenticate the user. Once the user authentication is succeeded, the account manager 151 creates a query for obtaining regional information of the region where the user is located using the user ID and issues the query to the user information storage unit 140. Then, the account manager 151 obtains the regional information of the user to create a localize option 152.

For example, it is assumed that the table illustrated in FIG. 4 is stored in the user information storage unit 140, and the account manager 151 receives a user ID "001" from the user terminal 50. In this example, the account manager 151 issues a query created using the user ID "001" to the user information storage unit 140, and obtains an ID of the time zone "005 (UTC-5)", a region "USA", a language "001 (English)", a currency "DOLLAR", and an exchange rate "0.0125" as regional information to create the localize option 152 as illustrated in FIG. 6. The ID of the time zone, the currency, and the exchange rate are numerical values according to the region.

For another example, the table illustrated in FIG. 4 is stored in the user information storage unit 140 and the account manager 151 receives a user ID "002" from the user terminal 50. In this example, the account manager 151 issues a query created using the user ID "002" to the user information storage unit 140, and obtains an ID of the time zone "109 (UTC+9)", a region "JAPAN", a language "002 (Japanese)", a currency "YEN", and an exchange rate "1" as regional information to create the localize option 152 as illustrated in FIG. 7. The time zone, the currency, and the exchange rate are numerical values according to the region.

In addition, the account manager 151 receives a report generation request from the user terminal 50 and obtains basic information of the report such as items to be displayed therein from the report generation request, and includes the basic information in a report option 153. Then, the account manager 151 instructs the report generator 154 to generate the report.

Specifically, the account manager 151 receives the report generation request depending on a type of the report to be generated from the user terminal 50. Types of the report include a meter report relating to a cost for maintaining and managing the device (total cost of ownership, TCO) that is an example of the cost on the device, an SLA report reflecting whether the service information meets the contract information, and an integrated report integrating the both reports above. For example, the account manager 151 receives a meter report generation request including the basic information of the report such as the device information, a TCO value, and a period to calculate the TCO value from the user terminal 50. Then, the account manager 151 instructs the report generator 154 to generate the requested type of the report.

After the generation of the report is instructed by the account manager 151, the report generator 154 uses the localize option 152 and the report option 153 obtained from the account manager 151 to create the report localized for the region represented in the localize option 152 and outputs the report to the user terminal 50. The report localized for the region represented in the localize option 152 is such a report intended for (corresponding to) the user located in the region represented in the localize option 152. In other words, the report localized for the region represented in the localize option 152 is such a report in which the contents of the report option 153 or the report raw data 123 are described according to the regional information in the localize option 152.

Specifically, after the generation of the meter report is instructed by the account manager 151, the report generator 154 obtains the report raw data 123 from the device management information storage unit 130. Then, the report generator 154 uses the localize option 152, the report option 153, and the report raw data 123 to create the meter report localized for the region represented in the localize option 152 and outputs the report to the user terminal 50.

For example, if a user having a user ID "001" logs in through the user terminal 50 and instructs the generation unit 150 to generate a meter report, the localize option 152 has an ID of the time zone "005 (UTC-5)", a region "USA", a language "001 (English)", a currency "DOLLAR", and an exchange rate "0.0125" (refer to FIG. 6). The report option 153 includes the device information, the TCO value, and the period to calculate the TCO value as January 2011 to April 2011. Although any language may be used for the report option 153, the user ID of the user who requested the generation of the report is "001" in this example, the report option 153 is thus described in English. Accordingly, the report option 153 is represented in text as illustrated in FIG. 8 and includes Device Property (Manufacture, Model, Serial Number), TCO value ($), and Data value for TCO value (January 2011, February 2011, March 2011, April 2011). The business bases a and b exist in China as described above, the device management information storage unit 130 thus stores therein the time zone information representing the time zone of China (UTC+8) and the report raw data 123 to be associated with each other.

In this example, the report generator 154 generates the meter report illustrated in FIG. 9.

Specifically, the report generator 154 describes the content of the report option 153 in English because the language is determined as English in the localize option 152 and includes Device Property (Manufacture, Model, Serial Number), TCO value ($) (January 2011, February 2011, March 2011, April 2011). As described above with reference to FIG. 8, the report option 153 is described in English, thus the report generator 154 uses the report option 153 as it is. If the report option 153 is described in any language other than English, the report generator 154 translates the content of the report option 153 into English.

The report generator 154 calculates the time difference "+13 hours" using the time zone "UTC-5" indicated by the ID of the time zone in the localize option 152 and the time zone "UTC+8" indicated by the time zone information in the device management information storage unit 130.

Then, the report generator 154 uses the calculated time difference "+13 hours" to correct the period from January 2011 to April 2011 to the period from 13:00 on Jan. 1, 2011 to 13:00 on May 1, 2011 and obtains the report raw data 123 corresponding to the period from 13:00 on Jan. 1, 2011 to 13:00 on May 2011 from the device management information storage unit 130.

The report generator 154 sums up the number of output sheets for each device in the report raw data 123 during the period from 13:00 on Jan. 1, 2011 to 13:00 on Feb. 1, 2011 to obtain the number of output sheets in January 2011, and multiplies the TCO value by 0.0125 that is the exchange rate for DOLLAR in the localize option 152 to obtain the TCO value converted into the U.S. dollars in January 2011. The report generator 154 also calculates the TCO values in February 2011, March 2011, and April 2011 in the same manner. As a result, the number of output sheets of the device in the report raw data 123 will be converted into a numerical values according to the region.

The report generator 154 represents the device information or the TCO values in the report raw data 123 according to the items described in English, thereby generating the meter report illustrated in FIG. 9.

For another example, it is assumed that a user having a user ID "002" logs in through the user terminal 50 and instructs the generation unit 150 to generate a meter report. In this case, the localize option 152 has an ID of the time zone "109 (UTC+9)", a region "JAPAN", a language "002 (Japanese)", a currency "YEN", and an exchange rate "1" (refer to FIG. 7). The report option 153 includes the device information, the TCO value, and the period to calculate the TCO value as January 2011 to April 2011. The user ID of the user who requested the generation of the report is "002" in this example, the report option 153 is thus described in Japanese. Accordingly, the report option 153 is represented in text as illustrated in FIG. 10 and includes Device Property (Manufacture, Model, Serial Number), TCO value (Yen), and Data value for TCO value (January 2011, February 2011, March 2011, April 2011). The business bases a and b exist in China as described above, the device management information storage unit 130 thus stores therein the time zone information representing the time zone of China (UTC+8) and the report raw data 123 to be associated with each other.

In this example, the report generator 154 generates the meter report illustrated in FIG. 11.

Specifically, the report generator 154 describes the content of the report option 153 in Japanese because the language is determined as Japanese in the localize option 152 and includes Device Property (Manufacture, Model, Serial Number), TCO value (Yen) (January 2011, February 2011, March 2011, April 2011). As described above with reference to FIG. 10, the report option 153 is described in Japanese, thus the report generator 154 uses the report option 153 as it is. If the report option 153 is described in any language other than Japanese, the report generator 154 translates the content of the report option 153 into Japanese.

The report generator 154 calculates the time difference "−1 hour" using the time zone "UTC+9" indicated by the ID of the time zone in the localize option 152 and the time zone "UTC+8" indicated by the time zone information in the device management information storage unit 130.

Then, the report generator 154 uses the calculated time difference "−1 hour" to correct the period from January 2011 to April 2011 to 23:00 on Dec. 31, 2010 to 23:00 on Apr. 30, 2011 and obtains the report raw data 123 corresponding to the period 23:00 on Dec. 31, 2010 to 23:00 on Apr. 30, 2011 from the device management information storage unit 130.

The report generator 154 sums up the number of output sheets for each device in the report raw data 123 during the period from 23:00 on Dec. 31, 2010 to 23:00 on Jan. 1, 2011 to obtain the number of output sheets in January 2011, and multiplies the TCO values by 1 that is the exchange rate for YEN in the localize option 152 to obtain the TCO value converted into the Japanese yen in January 2011. The report generator 154 also calculates the TCO value in February 2011, March 2011, and April 2011 in the same manner. As a result, the number of output sheets of the device in the report raw data 123 will be converted into numerical values according to the region.

The report generator 154 represents the device information or the TCO values in the report raw data 123 according to the items described in Japanese, thereby generating the meter report illustrated in FIG. 11.

After the generation of the integrated report is instructed by the account manager 151, the report generator 154 obtains the report raw data 123 from the device management information storage unit 130 and requests the collection unit 120 to collect the contract information and the service information in order to obtain the contract information and the common object for the service information. The report generator 154 creates a data object in which the report raw data 123 and the common object for the service information are associated with each other using the serial number as a key. In addition, the report generator 154 uses the localize option 152, the report option 153, the data object, and the contract information to create the integrated report localized for the region represented in the localize option 152 and output the integrated report to the user terminal 50.

The operations of the report generation system of the present embodiment will now be described.

FIG. 12 is a flowchart illustrating an example of device management information correction processing performed in the report generation system 10 of the present embodiment.

Firstly, the data source manager 121 obtains a connector name associated with a business base ID indicating a business base of a collection target from the connector information storage unit 110 at timing of device management information collection (Step S110).

The data source manager 121 then creates a connector corresponding to the obtained connector name through reflection (Step S112). In the present embodiment, the data source manager 121 creates the connector 122a from a connector name associated with the business base ID of the business base a, and creates the connector 122b from the connector name associated with the business base ID of the business base b.

The connectors 122a and 122b then create a query, according to types of data sources or table definitions of the respective systems, that requests the data sources of the device management systems 20a and 20b to obtain the device management information (Step S114).

The connectors 122a and 122b then transmit the created queries to the device management systems 20a and 20b to perform obtaining inquiry for device management information, respectively (Step S116).

Subsequently, when the connectors 122a and 122b can communicate with the device management systems 20a and 20b, respectively (Yes at Step S118), the connectors 122a and 122b obtain the pieces of device management information from the device management systems 20a and 20b and map the pieces of device management information to the common object for device management information (report raw data 123) (Step S120).

The data source manager 121 then stores the common objects for device management information to which the device management information has been mapped in the device management information storage unit 130 (Step S122).

When the connectors 122a and 122b fail to communicate with the device management systems 20a and 20b, respectively (No at Step S118), the connectors 122a and 122b record an error log (Step S124).

FIG. 13 is a flowchart illustrating an example of meter report generation processing performed in the report generation apparatus 100 of the present embodiment.

Firstly, the account manager 151 receives log-in from the user through the user terminal 50 to obtain a user ID and password of the user to authenticate the user (Step S140).

Once the user authentication is succeeded, the account manager 151 creates a query for obtaining regional information of the region where the user is located using the user ID and issues the query to the user information storage unit 140 (Step S142).

Then, the account manager 151 obtains the regional information of the user as a localize option 152 (Step S144).

In addition, the account manager 151 receives a meter report generation request from the user terminal 50 (Step S146) and obtains basic information of the report such as items to be displayed therein from the report generation request to create a report option 153 (Step S148). Then, the account manager 151 instructs the report generator 154 to generate a report.

After the generation of the meter report is instructed by the account manager 151, the report generator 154 obtains the report raw data 123 from the device management information storage unit 130 (Step S150).

Then, the report generator 154 uses the localize option 152, the report option 153, and the report raw data 123 to create the meter report localized for the region represented in the localize option 152 (Step S152) and outputs the meter report to the user terminal 50 (Step S154).

FIG. 14 is a flowchart illustrating a detailed example of meter report generation processing performed in the report generation apparatus 100 of the embodiment and illustrates details of the Step S152 illustrated in FIG. 13.

First, the report generator 154 obtains langType (language) from the localize option 152 (Step S160).

The report generator 154 localizes the report option 153 into the language represented by the obtained langType (Step S162). If the report option 153 is described in the language represented by the obtained langType, the report generator 154 uses the report option 153 as it is. If the report option 153 is described in any language other than the language represented by the obtained langType, the report generator 154 translates the content of the report option 153 into the language represented by the obtained langType.

The report generator 154 obtains time_format_id (an ID of the time zone) from the localize option 152 (Step S164).

The report generator 154 obtains the time zone information associated with the report raw data 123 from the device management information storage unit 130 (Step S166).

The report generator 154 calculates a time difference between the time zone indicated by time_format_id and the time zone indicated by the time zone information (Step S168).

The report generator 154 shifts the period to calculate the TCO value in the report option 153 by the calculated time difference (Step S170).

The report generator 154 obtains the number of output sheets of the device in the report raw data 123 for each period in the period to calculate the TCO value after the shifting above (Step S172).

The report generator 154 obtains currency_name (the currency) and "rate" (the exchange rate of the currency) from the localize option 152 (Step S174).

The report generator 154 localizes the obtained number of output sheets of the device into the TCO value converted into the obtained currency (Step S176).

The report generator 154 represents the device information or the calculated TCO value in the report raw data 123 according to the items in the report option 153 described in the obtained language, thereby generating the meter report (Step S178).

As described above, in the present embodiment, a report localized for the region where the user is located is generated, whereby a report can be created taking account of the characteristics of the region where the user is located. Therefore, if the customer who has introduced an MPS is a global enterprise that has developed business globally and users thereof in various regions look at the report, the users can readily understand the content of the report.

According to the present embodiment, for example, the TCO of a device is calculated in the currency used in the region where the user is located, and the users can readily understand the content of the report even if users in various regions look at the report.

According to the present embodiment, for example, the TCO of the device is calculated taking account of the time difference between the region where the device is installed and the region where the user is located, and the users can readily understand the content of the report even if users in various regions look at the report.

According to the present embodiment, for example, the report is generated in the language used in the region where the user is located, and the users can readily understand the content of the report even if users in various regions look at the report.

Hardware Configuration

Figure 15:
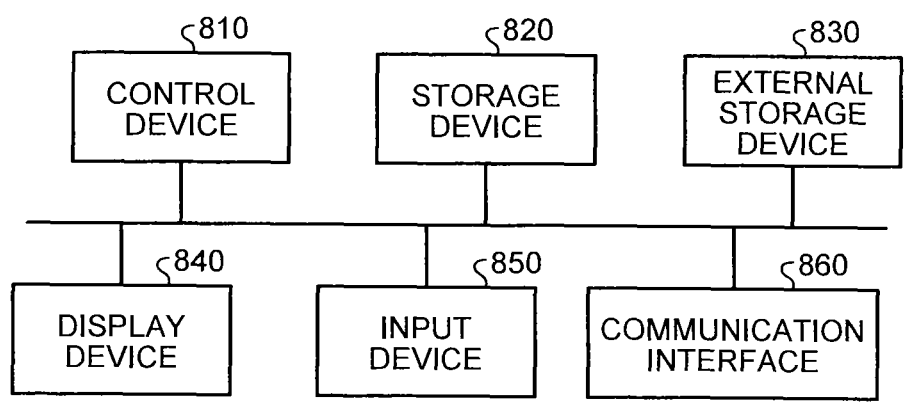
FIG. 15 is a diagram illustrating an example of the hardware configuration of the report generation apparatus of the embodiment.

FIG. 15 is a diagram illustrating an example of the hardware configuration of the report generation apparatus 100 of the present embodiment. The report generation apparatus 100 of the present embodiment includes a control device 810 such as a CPU, a storage device 820 such as ROM or RAM, an external storage device 830 such as an HDD, a display device 840 such as a display unit, an input device 850 such as a keyboard or a mouse, and a communication interface 860, and has a hardware configuration using a typical computer.

A report generation program executed by the report generation apparatus 100 of the present embodiment is an installable or executable file and is stored and provided in a computer-readable recording medium, such as a compact disc read only memory (CD-ROM), a compact disc recordable (CD-R), a memory card, a digital versatile disk (DVD), or a flexible disk (FD).

Furthermore, the report generation program executed by the report generation apparatus 100 of the present embodiment may be stored on a computer connected to a network such as the Internet, and provided through downloading via the network. The report generation program executed by the report generation apparatus 100 of the present embodiment may be provided or distributed via a network such as the Internet. Alternatively, the report generation program executed by the report generation apparatus 100 of the present embodiment may be incorporated in, for example, ROM and provided.

The report generation program executed by the report generation apparatus 100 of the present embodiment has a module configuration for achieving the above-described units on a computer. As an actual hardware, the CPU reads and executes the report generation program from the HDD to the RAM such that the respective units are achieved on the computer.

The present invention is not limited to the above-described embodiment and various variations can be made to the present invention.

MODIFICATIONS

The image forming device has been described by way of example in the embodiment, but the present invention is not limited thereto and any information processing device such as a personal computer (PC), or any electronic device such as a projector, a camera, a refrigerator, a fluorescent light, a vending machine, and a hand-held terminal may be applied to the embodiment of the present invention.

The present invention can provide the advantageous effect of generating a report taking account of the characteristics of the region where the user is located.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A report generation apparatus comprising:
   circuitry configured as
      a user information storage part that stores therein user identification information for identifying a user that uses an image forming device in association with regional information on a region where the user is located;
      a regional information obtaining part that receives user identification information and obtains regional information associated with the received user identification information from the user information storage part;
      a generator that obtains device management information relating to output of the image forming device and generates a report using the obtained device management information and the obtained regional information; and
      a generation request receiving part that receives a generation request for the report, wherein
   the generator obtains requested information from the generation request and generates a report localized for the region represented by the obtained regional information based on contents of the obtained device management information and the obtained requested information,
   the device management information is represented at least as numerical data,
   the requested information is represented in text data,
   the regional information includes a numerical value representing the region and includes a language used in the region,
   the generator generates, as the report, a report in which the device management information is converted into the numerical value according to the region, and the requested information is described in the language used in the region,
   the numerical value according to the region includes a currency used in the region,
   the generator converts the device management information into the currency used in the region to generate, as the report, a report in which a cost relating to the image forming device is calculated in the currency used in the region,
   the report generation apparatus further comprising circuitry configured as a period receiving part that receives a period to calculate the cost,
   the numerical value according to the region further comprises a time zone of the region,
   the device management information represents usage of the image forming device for every day and hour, and
   the generator corrects the period received by the period receiving part to a corrected period using the time zone of the region represented in the regional information and a time zone of the region where the image forming device is installed to obtain the device management information in the corrected period, and generates, as the report, a report in which the cost of the device is calculated for the corrected period.

2. A report generation system comprising:
   circuitry configured as
      a user information storage part that stores therein user identification information for identifying a user that uses an image forming device in association with regional information on a region where the user is located;
      a regional information obtaining part that receives user identification information and obtains regional information associated with the received user identification information from the user information storage part;
      a generator that obtains device management information relating to output of the image forming device and generates a report using the obtained device management information and the obtained regional information; and
      a generation request receiving part that receives a generation request for the report, wherein
   the generator obtains requested information from the generation request and generates a report localized for the region represented by the obtained regional information based on contents of the obtained device management information and the obtained requested information,
   the device management information is represented at least as numerical data,
   the requested information is represented in text data,
   the regional information includes a numerical value representing the region and includes a language used in the region,
   the generator generates, as the report, a report in which the device management information is converted into the numerical value according to the region, and the requested information is described in the language used in the region,
   the numerical value according to the region includes a currency used in the region,
   the generator converts the device management information into the currency used in the region to generate, as the report, a report in which a cost relating to the image forming device is calculated in the currency used in the region,
   the report generation system further comprising circuitry configured as a period receiving part that receives a period to calculate the cost,
   the numerical value according to the region further comprises a time zone of the region,
   the device management information represents usage of the image forming device for every day and hour, and
   the generator corrects the period received by the period receiving part to a corrected period using the time zone of the region represented in the regional information and a time zone of the region where the image forming device is installed to obtain the device management information in the corrected period, and generates, as the report, a report in which the cost of the device is calculated for the corrected period.

3. A computer program product comprising a non-transitory computer-readable medium including programmed instructions, wherein the instructions cause a computer to execute:

receiving user identification information for identifying a user that uses an image forming device;

obtaining regional information associated with the received user identification information from a user information storage part that stores therein the user identification information in association with regional information on a region where the user is located;

obtaining device management information relating to output of the image forming device;

generating a report using the obtained device management information and the obtained regional information; and receiving a generation request for the report, wherein the generating includes obtaining requested information from the generation request and generating a report localized for the region represented by the obtained regional information based on contents of the obtained device management information and the obtained requested information, the device management information is represented at least as numerical data, the requested information is represented in text data, the regional information includes a numerical value representing the region and includes a language used in the region, the generating includes generating, as the report, a report in which the device management information is converted into the numerical value according to the region, and the requested information is described in the language used in the region, the numerical value according to the region includes a currency used in the region, the generating includes converting the device management information into the currency used in the region to generate, as the report, a report in which a cost relating to the image forming device is calculated in the currency used in the region, the instructions further causing the computer to receive a period to calculate the cost, the numerical value according to the region further comprises a time zone of the region, the device management information represents usage of the image forming device for every day and hour, and the generating includes correcting the period received by the period receiving part to a corrected period using the time zone of the region represented in the regional information and a time zone of the region where the image forming device is installed to obtain the device management information in the corrected period, and generating, as the report, a report in which the cost of the device is calculated for the corrected period.

\* \* \* \* \*